(12) United States Patent
Roberts et al.

(10) Patent No.: US 7,193,515 B1
(45) Date of Patent: Mar. 20, 2007

(54) SYSTEM AND METHOD FOR CENTRALIZED SECURITY SCREENING

(76) Inventors: Jon L. Roberts, 529 Clear Spring Rd., Great Falls, VA (US) 22066; Elliott D. Light, 12 Bentana Way, Rockville, MD (US) 20850; Brian Boesch, 38 John Singer Sargent Way, Marlton, NJ (US) 08053

( * ) Notice: Subject to any disclaimer, the term of this patent is extended or adjusted under 35 U.S.C. 154(b) by 0 days.

(21) Appl. No.: 11/234,915

(22) Filed: Sep. 26, 2005

Related U.S. Application Data (63) Continuation-in-part of application No. 10/422,526, filed on Apr. 24, 2003, now Pat. No. 7,071,823.

(60) Provisional application No. 60/375,031, filed on Apr. 24, 2002.

(51) Int. Cl.
*G08B 13/14* (2006.01)
(52) U.S. Cl. ............................... 340/568.1; 340/10.42; 709/217
(58) Field of Classification Search ............. 340/568.1, 340/572.1, 572.4, 573.1, 539.11, 531, 514, 340/505, 10.1, 10.42; 378/57; 705/5; 709/217, 709/219
See application file for complete search history.

(56) References Cited

U.S. PATENT DOCUMENTS

| | | | |
|---|---|---|---|
| 3,678,278 A | 7/1972 | Peil | |
| 4,471,343 A | 9/1984 | Lemelson | |
| 5,182,764 A | 1/1993 | Peschmann et al. | |
| 6,218,943 B1 | 4/2001 | Ellenbogen | |
| 6,707,879 B2 | 3/2004 | McClelland et al. | |
| 6,807,458 B2 * | 10/2004 | Quackenbush et al. | 700/213 |
| 2003/0085163 A1 | 5/2003 | Chan et al. | |
| 2003/0225612 A1 * | 12/2003 | DeSimone et al. | 340/573.1 |
| 2004/0088584 A1 | 5/2004 | Shachar et al. | |
| 2004/0124982 A1 * | 7/2004 | Kovach | 340/572.1 |
| 2005/0057354 A1 * | 3/2005 | Jenkins et al. | 340/573.1 |
| 2005/0065834 A1 * | 3/2005 | Hale et al. | 705/5 |
| 2005/0111618 A1 * | 5/2005 | Sommer et al. | 378/57 |

FOREIGN PATENT DOCUMENTS

JP 2002362730 A * 12/2002

* cited by examiner

*Primary Examiner*—Thomas Mullen
(74) *Attorney, Agent, or Firm*—Roberts Mardula & Wertheim, LLC (57) ABSTRACT

A system and method for centralized security screening of packages including baggage. The system creates images and data concerning baggage to be reviewed, packetizes the data long with additional identification information, and conveys the data packets to a central screening location. All analysis of the baggage information is accomplished in a centralized way with risk assessments being provided to each image. Upon sensing of a package or baggage of concern, alerts may be sent to the screening location for action. Artificial intelligence tools are used to pre-screen images to assist with workload assignment. Baggage may also be associated with the identity of a passenger. The passenger identity is used to acquire passenger information that is incorporated into the baggage screening process. Screening rules that utilize passenger information are implemented to determine a screening response based on a passenger-specific basis.

17 Claims, 5 Drawing Sheets

SYSTEM AND METHOD FOR CENTRALIZED SECURITY SCREENING

CROSS REFERENCE TO RELATED APPLICATION

This application is a continuation in part of U.S. application Ser. No. 10/422,526, now U.S. Pat. No. 7,071,823, filed Apr. 24, 2003, which application claims priority from U.S. provisional patent application Ser. No. 06/375,031, filed Apr. 24, 2002. The 10/422,526 application and the 60/375,031 application are incorporated herein by reference in their entirety for all purposes.

BACKGROUND

This invention relates generally to baggage screening. More particularly the present invention is a system and method for centralized screening of images and other data relating to bags and packages passing through security screen checkpoints, and the methods for training and quality control relating thereto. In addition, other applications of this system and method are envisioned in the field of security and screening application such as entrance guard stations and vehicle inspection at checkpoints.

Since Sept. 11, 2001 security has been a heightened concern of the private sector, all travelers and government organizations. Nowhere has the security been more emphasized than in the airline travel industry. The screening of individual articles of clothing and baggage has now become a priority item for expenditure of government funds and for purchase of new equipment and training of competent individuals.

At the present time airline baggage screening is an extremely slow process often resulting in passenger delays and frustration on the part of the traveling public. Further, each baggage screening point generally requires two or more people to view images of bags being screened at each screening point. Hence the entire screening process is quite labor intensive. While the term "baggage" screening is used in this application, the application is not so limited. Other packages, backpacks, purses, luggage, and other types of containers equally fall within the scope of the invention. For convenience, the term "baggage" will be used herein.

To make matters worse, the level of screening to be accomplished exceeds the capabilities both in terms of manpower and in training of individuals who are to perform the screen. Thus workers who are tired from working long shits make mistakes. In addition, poorly trained screeners are rushed into the screening process and make additional mistakes. In addition to all of the above, workers who are screeners understand that their effectiveness cannot really be measured. Therefore their attention to their job tends to be less than optimum.

The current situation with the checkpoint screening of bags is less than satisfactory. Bags are scanned and images are locally displayed, there is no record of the screening action and a local operator of screening equipment must then evaluate the extra images or other types of images that are collected. Given the huge lines that occur in certain airports, operators are rushed and therefore overloaded, or in some cases they are under utilized. While it is possible to use certain sophisticated artificial intelligence image analysis, this only improves the performance slightly at the screening location.

Additionally, there is no meaningful system for associating carry-on baggage with a passenger or for coordinating the inspection of checked baggage across a transportation system.

What is therefore a useful enhancement to the current environment is a system and method for improved baggage screening. Such a system and method would improve the speed of the screening, decrease human resources required for the screening, make metrics available so that worker efficiency and system efficiency can be tested, increase the responsiveness to any potential threats and enable the detection of potential attacks that are in progress. Such a system and method would also associate carry-on baggage with a passenger and permit the local facilities within a transportation system to share information relating to checked baggage and passengers.

SUMMARY

An embodiment of the present invention provides a system and method for enhanced security screening of baggage. In this embodiment, a network of local x-ray machines, explosive "sniffers" and other sensors locally collect data and images, collectively "screening data." Such screening data is then bundled into a data package and transmitted to a central location. Thereafter, the screening data are evaluated centrally and a response rapidly sent back to the security checkpoint. Such response can be either an "ok" for the baggage or a message for implementing an enhanced enforcement mechanism.

In addition to the centralized viewing of baggage images, the present invention provides for "canned" test images to be inserted into the data stream so that baggage screeners at the central location can be tested for their own training, evaluation, and responsiveness purposes. These images can be randomly input into the data stream thereby testing the screener's alertness for any security risks associated with bags being viewed.

In another embodiment of the present invention, the results of inspection of both checked baggage and carry-on baggage are provided to a central screening authority. The central screening authority uses a rules engine to determine whether the data are indicative of a threat to the transportation system.

In yet another embodiment of the present invention, both the checked baggage and the carry-on baggage are associated with a passenger. This association may be accomplished using bar code, RFID tags, and other technology known in the art. The central screening authority uses this association to screen baggage associated with a passenger against passenger data available to the central screening authority. By way of illustration, a passenger may have a history of "testing" the security of a transportation system by attempting to check or carry on prohibited articles. Another passenger may be a law enforcement officer that is entitled to check or carry on articles that are generally prohibited. In this embodiment of the present invention, the central screening authority may issue an alert to a remote screen facility that considers passenger-specific data in the screening process resulting in more permissive or restrictive screening behavior as appropriate.

It is therefore an aspect of the present invention to enhance the quality of security inspection of baggage.

It is a further aspect of the present invention to increase the speed at which security assessments of baggage can be made.

It is still another aspect of the present invention to decrease the amount of labor required to inspect baggage at security checkpoints.

It is yet another aspect of the present invention to provide for the measurement of the effectiveness of both the screening process and of individual screeners as well as enhancing training.

It is still another aspect of the present invention to enable a nationwide linking of an inspection system so that assessment of nationwide attacks can be made. For example, on Sept. 11, 2001, a large number of individual bags carried small knives. While one or two such knives may be normal, the presence of a large number of independent bags with knives may have signaled a problem.

It is a further aspect of the present invention to increase the responsiveness to various changes in levels of threat associated with airline and other transportation travel.

It is a further aspect of the present invention to enable collection of a digital record of inspection decisions.

It is a further aspect of the present invention to balance the workload of inspection across multiple scanning stations and locations.

It is still another aspect of the present invention to shift the location of the "inspection" to locations where labor is more cost effective.

It is yet another aspect of the present invention to provide layers of inspections where simple images are inspected at one level while more complex images are inspected by higher trained individuals.

It is still another aspect of the present invention to apply centralized screening of images to support under vehicle inspection, cargo inspection, entrance and exit inspection, and other access control inspections.

It is a further aspect of the present invention to utilize centralized screening for quality assurance reviews, quality control, and other related industrial applications.

It is still another aspect of the present invention to apply artificial intelligence based tools for pre-screening of images prior to invoking a human review of images collected.

It is a further aspect of the present invention to sense with multiple sensors, and combine the images to create an enhanced composite image for subsequent inspection via artificial intelligence means or via human interface.

It is yet another aspect of the present invention to associate baggage with a passenger and incorporate passenger information into the baggage screening process. By way of illustration and not as a limitation, baggage is associated with a passenger using RFID tags and pollers.

It is another aspect of the present invention to implement screening rules that utilize passenger information to determine a screening response based on a passenger-specific basis.

It is a further aspect of the present invention to incorporate other RFID information into the boarding pass issuing process.

It is still another aspect of the present invention to link inspection centers across broad geographic areas in order to determine if any simultaneous trends are occurring in different airports, ports of entry, or other facilities conducting inspections.

It is a further aspect of the present invention to apply a rules engine to screening data relating to carry-on and checked baggage to determine whether the data are indicative of a threat to the transportation system.

It is yet another aspect of the present invention to associate carry-on and checked baggage with a passenger and to apply a rules engine to screening data and passenger data to determine whether determine whether the data are indicative of a threat to a transportation system.

These and other aspects of the present invention will be apparent from a review of the specification that follows.

DETAILED DESCRIPTION

Figure 1:
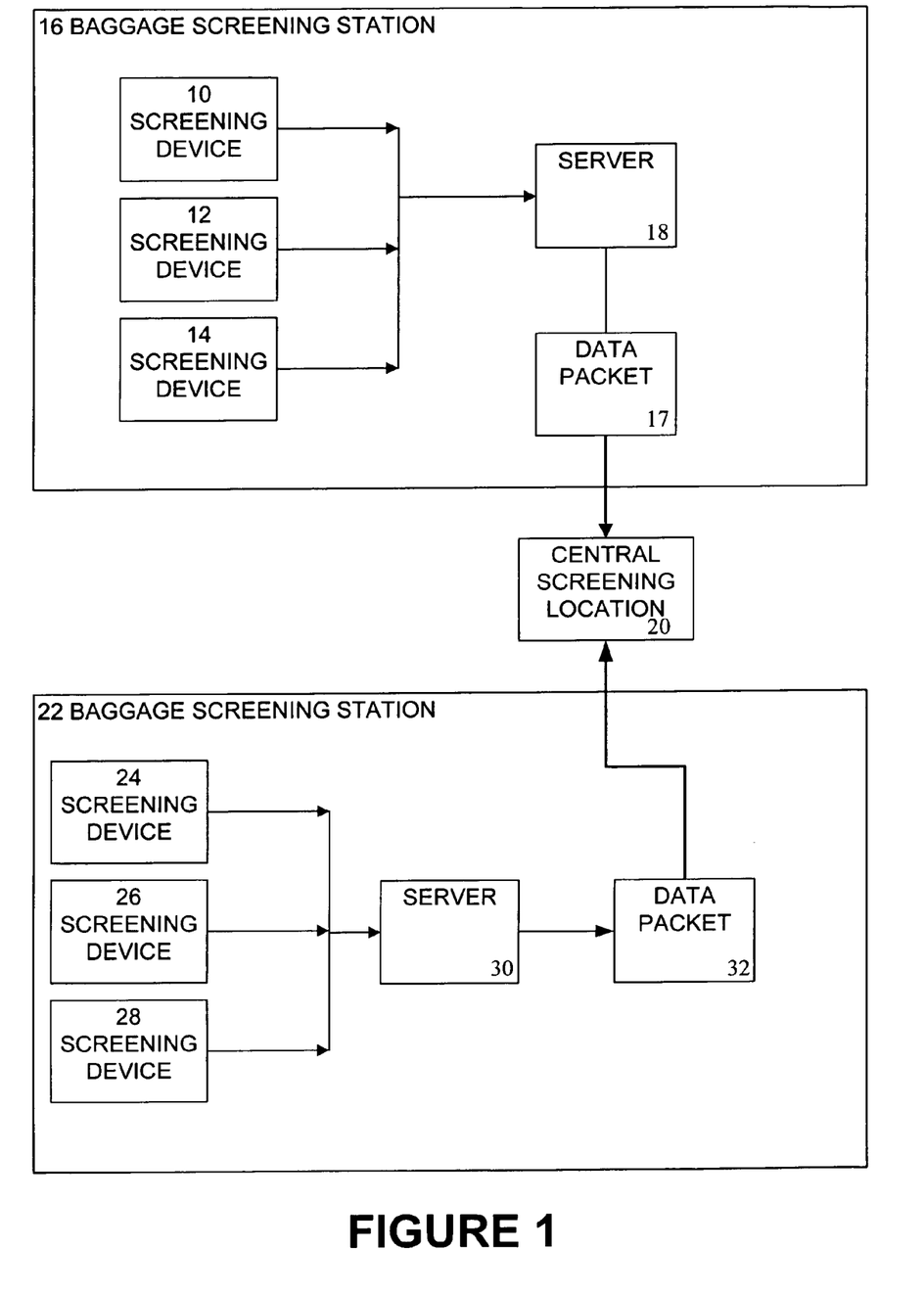
FIG. 1 illustrates the overall system of the present invention.

As noted above, the present invention is a system and method for centralized inspection and evaluation of baggage. Referring to FIG. 1, an overview of the centralized baggage screening system is illustrated. Baggage screening station 16 comprises baggage screening devices 10, 12, 14. This equipment may be x-ray equipment, electronic beam equipment, chemical sniffing equipment, or any type of inspection equipment currently used or projected to be used for inspecting packages in the future. Images and data recorded from these screening devices 10, 12, 14, are sent to local server 18. Local server 18 provides identification information noting such things as time an image was taken, location, screening equipment, and other information that identifies the location from which the actual data is being received. Server 18 packages this information into a data packet 17 and conveys that data packet to a central screening location 20, as more fully set forth below. Such data is collectively referred to as "screening data."

Similarly, another transportation facility comprises baggage screening station, 22 comprising baggage screening devices 24, 26, 28 which provide time tagged, and identified images and data to server 30. Server 30 then in turn creates it own packetized screening data 32 before shipment to central screening location 20.

By way of illustration and not as a limitation, the transportation facilities may be airports, train stations, bus stations, and subway stations. As will be appreciated by those skilled in the art, the central screening location may review screening data from all of these facilities simultaneously without departing from the scope of the present invention.

Figure 2:
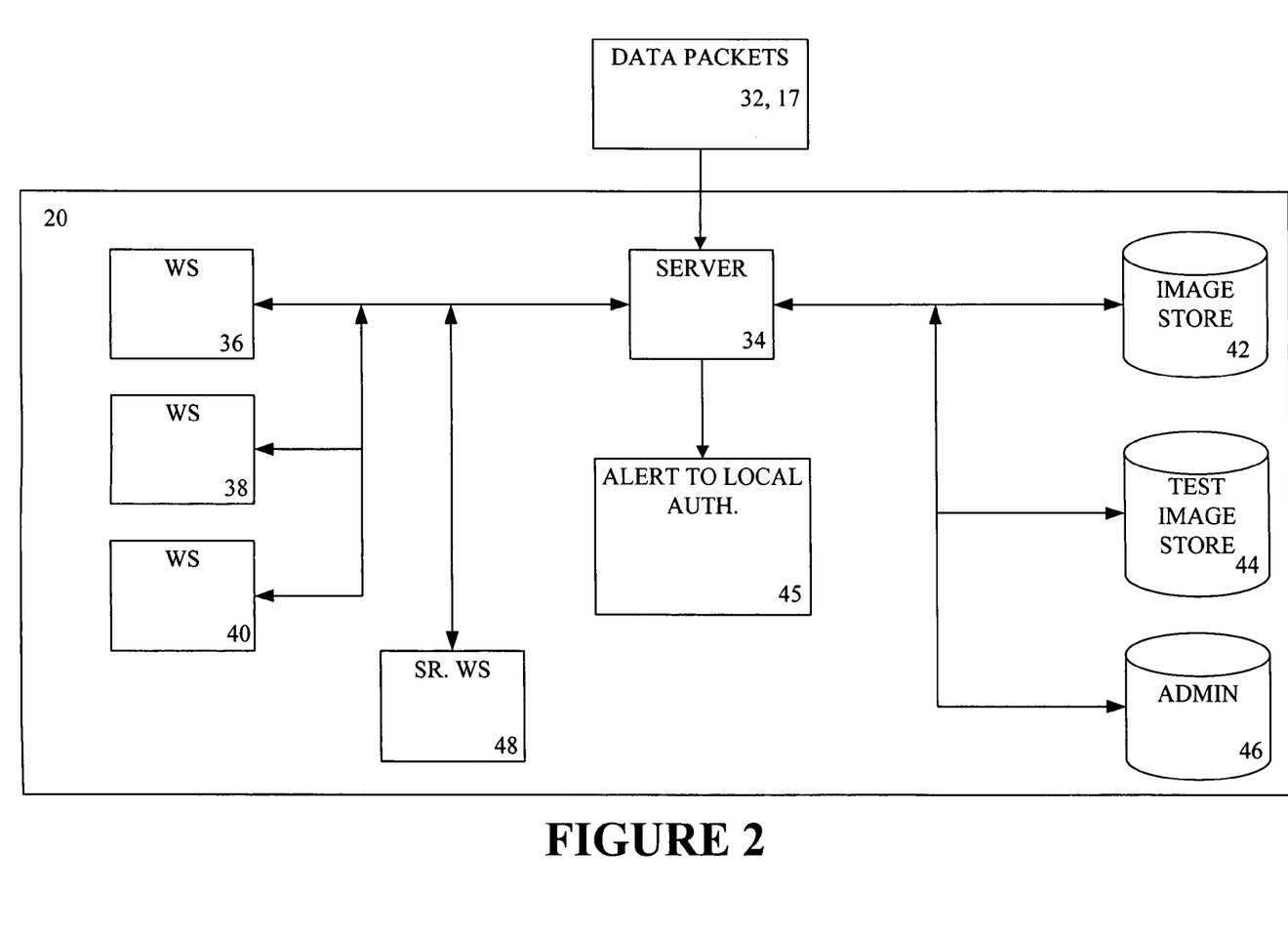
FIG. 2 illustrated the central evaluation facility of the present invention.

Referring to FIG. 2, the central screening location is illustrated. Screening data packets 32, 17 are received by server 34 and placed in a queue. An inspector at workstation 36 picks the next data packet in the queue for inspection. Similarly, workstations 38 and 40 select images from the data packets in a queue via server 34.

Inspectors at the various work stations 36, 38, 40 then inspect the images presented to them making judgments whether or not to "okay" the baggage in question and therefore pass that particular bag on to the passenger or to send a signal to "hand examine" or to sequester the baggage in question.

Inspectors at the various workstations 36, 38, and 40 can also assign a risk level to their inspection results with a low risk or high risk, or points in between being associated with the image (on any risk scale known in the art). Based upon the workload and the risk assessment number associated with the image, the baggage in question can then be passed to the passenger or held for subsequent inspection.

When an inspector notes an item of a particular threat, such information can be provided through server 34 to local authorities as an alert 45 so that other security action can be taken to detain the baggage and the passenger involved.

It is also possible for inspectors at workstations 36, 38, and 40 to ask for a higher level of review of an image in question. Where this occurs, the image in question is passed to a "senior" workstation 48 for subsequent review by a more senior experienced inspector. That inspector has the same options available to inspectors stationed at work stations 36, 38, and 40. That is, to assign a risk factor to the image, to detain the baggage, to provide an alert to local authorities and all other options available to other inspectors.

The central inspection location 20 also comprises an image store 42 where all images for given periods of time are stored in the event that subsequent review and quality control is necessary. These images in image store 42 can be called up for review by appropriate authorities.

The central inspection location 20 also comprises a test image store 44 whereby images having known items of interest or threat can be provided into the queue of server 34 for subsequent inspection by the various inspection stations 36, 38, and 40. In this fashion an inspector at any one of the workstations will receive a test image that the inspector does not know is in fact a test image. Thereafter the inspector's report can be made and quality of the inspector's work can be assessed.

The central inspection location 20 also comprises an administrative store 46 wherein test results, identification of various administrative items such as identification of inspectors, their locations, the stations being screened, and a variety of other administrative data is kept.

Server 34 also comprises various artificial intelligence types of tools. Such tools can recognize shapes, textures, and specifics of images that would automatically raise a flag. Server 34 can thus pre-process the data packets 32, 17 to view this type of information.

It is also important to note that various baggage screening stations may comprise not only images of the contents of baggage but may also contain data such as from explosive sniffers. Further, inspection of baggage may be accomplished by infrared, x-ray, electron beam, and other types of sensors known in the art. It is within the scope of the present invention to combine these images into a composite image that can then be presented as a data packet to the various inspection workstations 36, 38, and 40. Therefore inspectors at various workstations can receive enhanced images that are actually the composite of multiple data sources that are associated with the baggage inspection process.

In operation, x-rays, explosive "sniffers" or other type of inspection is executed. A processor at the inspection station detects the edges of baggage and separates the scans of each individual bag. Each image is then converted into a gray scale or other representation. Thereafter, the image is compressed to save data transmission time, and other data is associated with the image. For example, the inspection station number, the time of day, the bag ID at a minimum are all associated with a particular image before transmission. Other data that could be associated include (but are not limited to) photograph and ID of the bag's owner, flight information, impressions of the remaining physical inspectors about the owner. The compressed data is then transmitted to a central facility for inspection.

At the central inspection location 20, the data is placed into a queue. A pool of trained screeners pick data packets from the queue and review the individual images/data and respond with a range of responses. For example, the response may be and "ok" or "pass" on the particular bag. Thereafter the traveler can be sent on his way with the examined bag. A message could be sent to "hand examine" the particular bag. Whenever a hand examine message is sent, a risk factor is associated with the bag. For example, but without limitation, 1 being the lowest risk and 9 being the highest risk. Other types of rankings may also be used. Therefore in times of high traffic volume, a risk assessment can be made and low risk items can be "passed" without hand examination if that judgment call is made.

In addition, an alert in association with a definite threat or weapon can also be sent by the central facility to the screening station, to airport security, and also to regional security for a particular area. In this fashion a large-scale alert may be sent when a definite alert has been located by the operators.

At the baggage inspection stations, local operators then can operate on the response from the central inspection location to either pass a bag, inspect a bag, or detain the bag and the traveler.

At the central inspection location a hierarchy of review takes place. At the first tier level would be the lowest skilled operator. Such operators would categorize simple cases which are obviously safe or obviously hostile. In the event that the first tier operator cannot make a decision, more complex cases are sent onto a second tier review. At the second tier review, more skilled operators who are potentially higher paid, review the images. Such second tier operators are better able to understand the imaging process and deal with the potential electronic enhancements that may be available at their workstations. Finally a third tier of operators who are highly skilled handle the most complex evaluation situation. Note that there is no fundamental limit to the tiers of evaluation. One, two, three or more tiers could be utilized depending on need. This tiered approach, in addition to allowing less skilled human evaluators to perform triage, separating obviously innocuous or dangerous bags and only passing those needing further review to higher tiers, enables the introduction of less than perfect automated or heuristic evaluation tiers. While in conventional scanning an automated system that could only unambiguously clear 10 percent of bags would be nearly useless, in this system as an early screening level, it could reduce manpower needs by roughly 10 percent.

As a result of the review at the central inspection location various recommendations noted above can be made.

An analysis of bandwidth and communication needed to implement this system shows that it is quite feasible. At the present time the scanning or evaluation of a bag is approximately 5–10 seconds and includes the bags transit time through an inspection machine, operator evaluation time, and transmit time to a pick up area where the bag is picked up by the passenger, thus we have a time budget of at least 5 seconds to perform data compression, transmission, evaluation and response. X-ray images of approximately 1200 by 1200 pixels can be compressed substantially yielding image sizes of between 100,000 and 1,000,000 bits. This amount of data could be transmitted over a DSL link in 0.1–5 seconds or a DS-2 data link in less than 0.05 seconds. Thus it is feasible for a small airport with only a few stations to inexpensively transmit the required screening data, while large airports could easily transmit the volume of screening data generated.

Once the screening data arrives at the central inspection location, it is placed into a queue. According to an embodiment of the present invention, this queue is implemented using a high-speed scalable database system or systems. From this database, evaluators (both human and automated) will select the "next" work item to evaluate. A high-speed workstation can quickly display the images/data and allow the operator to make his/her assessment, then continue on to the next bag. Historical records (kept for a predetermined amount of time) would be made of the decision and of the underlying images/data for later analysis if necessary.

Note that unlike current systems is which an inspection results in pure yes/no determinations, embodiments of the present invention permit an evaluator to assign risks to the person or bag. These risks could be further evaluated even after the person has left the inspection station. Thus it is possible that a more judicious review of a particular bag may result in an alarm even after the person has entered the secure area. While clearly it is the intent to catch attackers at the stations, the ability to re-evaluate bags already in the security area may provide ways to catch or thwart attacks in progress.

Training/evaluation of operators could be easily accomplished in this system by simply adding canned "threat" images/data to the data queue to be processed by that operator. Thus an operator could receive up to several test bags per day, (rather than less than monthly in today's environment). This frequency of test data will encourage operators to be alert and provide quick detection of operators who are unable to perform. Since the workflow is completely computerized, a totally novice operator could be placed at a station and given on-the-job training by running a typical daily workload of historically collected data interspersed with test threat data. The system could prompt the operator and point out the threats in the training data through on-screen display initially and then only if there is a mistake made later. Allowing training to take place on the actual equipment in the actual environment will further decrease cost and increase the effectiveness of training.

Evaluators could also be backed up by other evaluators. Thus, an evaluator's results could be compared with results of a separate evaluator who is given the same data. This process could be used for periods of extreme threat, or simply to compare effectiveness and consistency of training.

Individual operators would be given ID's, thus when they "log on" to a workstation, they will be given work that is appropriate to them regardless of which station they use. Thus from the same station, a trainee would get training data, a level 1 evaluator would get appropriate data and a higher level expert evaluator would get only data that would require the most expert analysis.

While discussions have focused on a central inspection location, it is possible that there are multiple evaluation centers that either operate independently or preferentially, operate in conjunction, sharing evaluation data through access to each others databases as well as potentially sharing data to be evaluated to balance load.

In another embodiment of the present invention, the local baggage screening station is equipped to profile the baggage owner and to assign a risk factor (for any reason) or a non-risk factor. This data could be used to augment the data already passed with the baggage to enhance the evaluation of the bags' data.

In an embodiment of the present invention, the association of a passenger with an item of baggage is accomplished by applying RFID tags comprising RFID identifiers to the passenger's boarding document, checked baggage and carry-on baggage. The RFID identifiers are associated with the passenger thereby tying the passenger to specific items of baggage.

Figure 5:
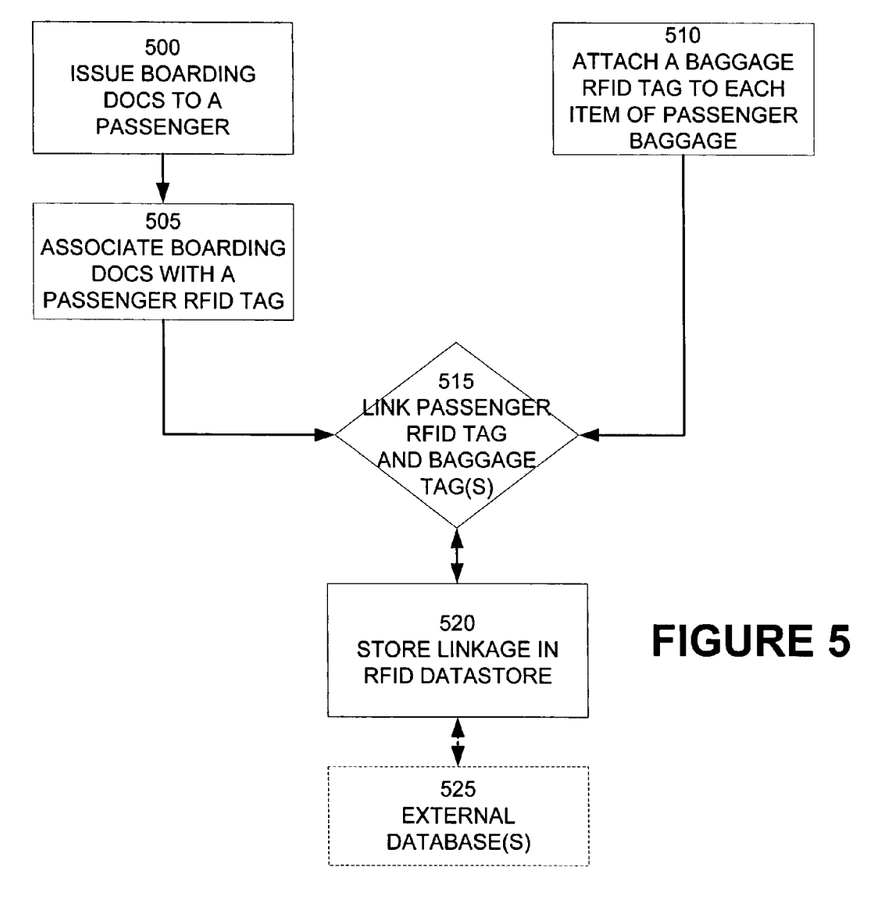
FIG. 5 illustrates a boarding document issuing process that utilizes RFID tags according to an embodiment of the present invention.

FIG. 5 illustrates a boarding document issuing process that utilizes RFID tags according to an embodiment of the present invention. A passenger is issued boarding documents 500. The boarding document is associated with a passenger RFID tag 505. A baggage RFID tag is physically attached to each item of baggage of the passenger 510. In an embodiment of the present invention, baggage RFID tags are issued for both carry-on and checked baggage. The passenger RFID tag and the baggage RFID tag(s) of the passenger are linked 515 and stored in an RFID datastore 520. Optionally, the datastore acquires passenger information from external databases 525 and shares information with the external databases 525. By way of illustration and not as a limitation, the external databases may be no-fly databases, customs database, immigration database, and crime databases. In an embodiment of the present invention, the passenger RFID tag and the baggage tag(s) are linked to a passport identifier.

Figure 3:
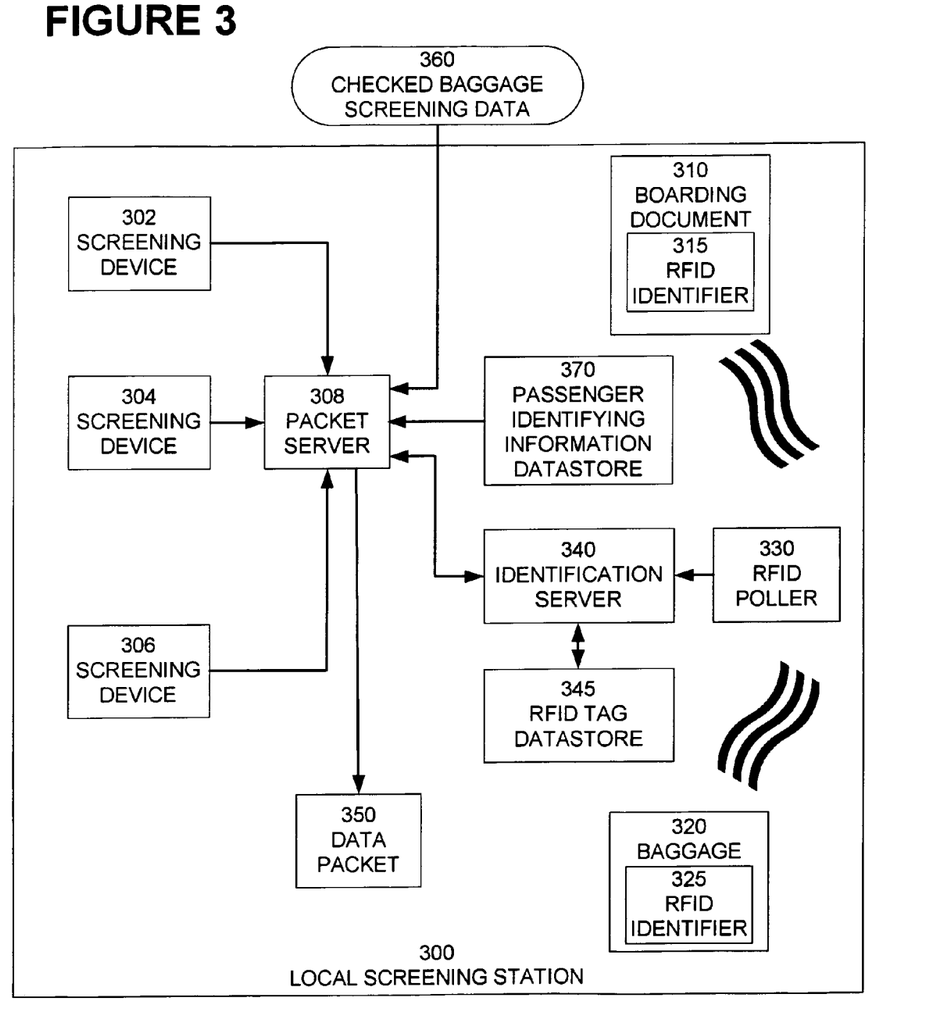
FIG. 3 illustrates a baggage screening station using RFID tags to associate a passenger with baggage according to an embodiment of the present invention.

FIG. 3 illustrates a baggage screening station using RFID tags to associate a passenger with baggage according to an embodiment of the present invention.

Referring to FIG. 3, a baggage screening station 300 comprises screening devices 302, 304, and 306. Screening data acquired by screening devices 302, 304, and 306 is sent to packet server 308. Baggage screening station 300 further comprises RFID poller 330, identification server 340 and RFID tag datastore 345. In this embodiment, boarding document 310 comprises an RFID tag having an RFID identifier 315. Similarly, baggage 320 comprises an RFID tag having an RFID identifier 325. The RFID poller periodically polls baggage screening station 300 for the RFID identifiers 315 and 325 associated with boarding document 310 and baggage 320 respectively.

When the RFID identifiers 315 and 325 associated with boarding document 310 and baggage 320 are captured at a baggage screening station 300, the RFID identifiers are provided to an RFID identification server 340. RFID identification server 340 accesses RFID tag datastore 345 to determine whether the RFID identifier in the RFID tag on the passenger's boarding document and RFID identifier on the baggage RFID tag presented by the passenger for screening match. A mismatch between the RFID tag on the passenger's boarding document and the baggage presented by the passenger for screening will cause the baggage screening station 300 to initiate a remedial response. According to an embodiment of the present invention, a remedial response may range from requesting an explanation from the passenger to detaining the passenger.

According to an alternate embodiment of the present invention, the RFID data acquired from the boarding document 310 and the baggage 320 are provided to a central screening location (see FIG. 2, 20) where the specific remedial response initiated by the baggage screening station will be assessed by a rules engine operating at the central screening location.

In another embodiment of the present invention, passengers may travel as a group so that a single member of the group may present all of the baggage for inspection. The group will be established at the time the boarding documents are issued so that the RFID identifiers of the members of the group are associated with each other and with the collective baggage of the group.

Screening data is obtained for the passenger's baggage, both for checked baggage 360 and baggage scanned by screening devices 302, 304, and 306. The screening data are forwarded to the central screening location (see FIG. 2, 20) for analysis as previously described. If the screening data is indicative of the presence of a prohibited article or substance, passenger identifying information of the passenger associated with the baggage comprising the prohibited item or substance is requested by the central screening location (see FIG. 2, 20) from packet server 308, which retrieves it from passenger identifying information datastore 370. Alternatively, the passenger identifying information may be provided with the screening data.

According to an embodiment of the present invention, passenger identifying information comprises a name, address, telephone number, email address, a passenger file location identifier issued by the transportation carrier, and a credit card number.

Figure 4:
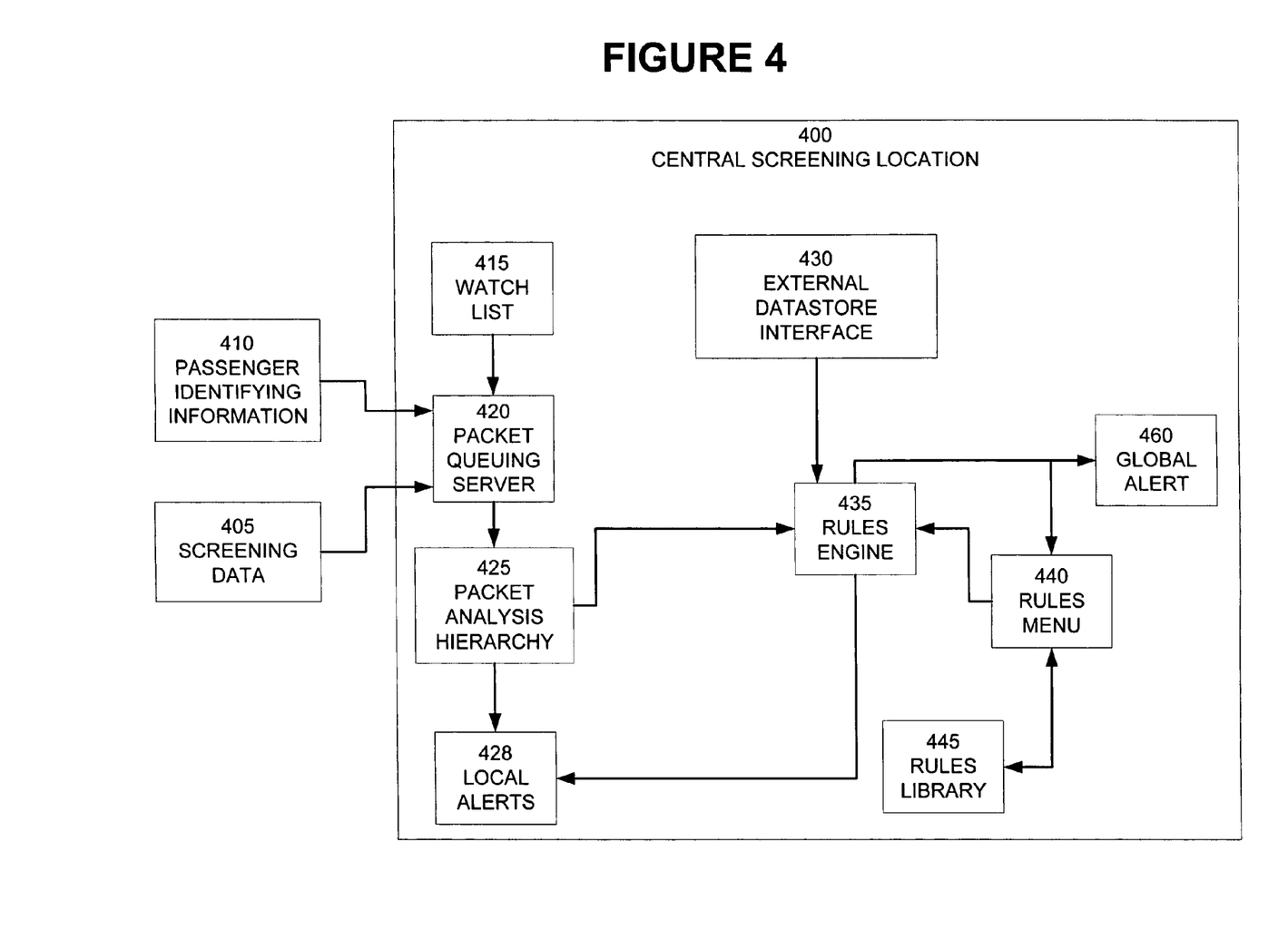
FIG. 4 illustrates an architecture of a central screening location comprising a rules engine according to an embodiment of the present invention.

FIG. 4 illustrates an architecture of a central screening location comprising a rules engine according to an embodiment of the present invention.

Referring to FIG. 4, central screening location 400 comprises a packet queuing server 420 that receives screening data 405 and passenger identifying information 410 from baggage screening stations (see FIG. 3). Screening data 405 comprises at least data created by screening carry-on baggage and may also include screening data acquired by screening checked baggage. The packet queuing server 420 routes packets to a packet analysis hierarchy 425 as previously described. In an embodiment of the present invention, the central screening location 400 maintains a watch-list 415 comprising passenger identifying information. In this embodiment, screening data and passenger identifying information are received together. Screening data 405 is treated specially by packet queuing server 420 for a passenger found to be on the watch list. In one embodiment of the present invention, the passenger is subject to a higher level of scrutiny than a passenger who is not on the watch-list. In another embodiment of present invention, the passenger is identified as a trusted person who is permitted to travel with otherwise prohibited items and substances.

The results of the packet hierarchical analysis 425 are used to issue local alerts 428 and are routed to a rules engine 435 to assess the risk posed by the identification of a prohibited item or substance in a passenger's baggage. Rules engine 435 also receives data from external datastores through external datastore interface 430. For example, passenger identifying information may be cross-checked with existing datastores to determine if factors exist in the passenger's historical data that when interpreted in light of the screening data are indicative of a threat to the transportation system. Passenger identifying information may also be cross-checked with existing datastores to obtain identifying information of associates of the passenger (individually, "associate identifying information"). Associate identifying information is then cross-checked with other passenger identifying information to determine if an associate of the passenger is traveling. If the associate is traveling, a determination is made as to the associate's place of origin, the associate's destination, and if the baggage of the associate was found to include a prohibited item or substance.

Rules engine 435 applies rules selected from a rules library 445 in accordance with rules menu 440. Rules menu 440 may be affected by the results of the application of a rule by rules engine 435. In this way, rules engine 435 is self-adjusting to a perceived security threat. Rules menu 440 may also be controlled by user input (not illustrated). Following the application of the rules menu 440, rules engine may issue a global alert 460 or revise a local alert 428.

As previously described, the transportation facilities may be airports, train stations, bus stations, and subway stations. As will be appreciated by those skilled in the art, the central screening location may review screening data from all of these facilities simultaneously without departing from the scope of the present invention.

The rules library 445 comprises security rules that are created or received by the central screening location 400. Security rules may be specific to a type of transportation facility, the size of the transportation facility, the location of the transportation facility, and to a variable security alert level established by the central screening location or a government agency having control of the central screening location.

Security rules may also be applied in stages. By way of illustration and not as a limitation, a first security rule is applied to an article of baggage (checked and carry-on) to determine whether the screening data for that article indicate that an "alert" should be issued for the article and, if so, the nature of the alert. A second security rule is applied to all screening data generated by a transportation facility on a continuous basis. A third rule is applied to all screening data generated by all transportation facilities within a geographic area. A fourth rule is applied to all screening data acquired world-wide. This staged application of security rules may be directed by user input or applied automatically by the rules menu 440 in response to direction from the rules engine 435.

As will be appreciated by those skilled in the art, the application of the various security rules may be preceded by data filters that reduce the volume of screening data to be processed by the rules engine. By way of illustration and not as a limitation, data filters may be applied at any stage to eliminate screening data by date, location, and content. Thus, a hierarchy of security rules may be established whereby only screening data reflecting that an item of baggage contains a prohibited or suspicious article is further evaluated.

In yet another embodiment of the present invention, a passenger is associated with an item of baggage and the security engine operates on passenger data as well as screening data. In this embodiment, the passenger is associated not only with checked baggage but with carry-on baggage as well.

As will be appreciated by those skilled in the art, the reference to RFID tags is exemplary and not limiting. Other means may be used for associating an object with an object owner without departing from the scope of the present invention. By way of illustration and not as a limitation, an object and an object owner may be associated using graphical codes (i.e. bar, 2-D, 3-D codes) and encoded magnetic field devices.

A centralized system and method of security screening has now been described. While baggage screening has been described, it is important to note that the present invention can be used to screen not only baggage but also packages of all types such as shopping bags, personal bags, backpacks and other types of packages that are desired to be screened at venues such as sporting events, theatrical events and events of all types where security enhancement is needed. While airports are a significant location, other locations must be protected as well. It will also be appreciated by those skilled in the art that use of RFID tags for baggage (checked and carry on) can also be used for baggage management purposes. For example, baggage throughput could easily be tracked (bags per hour handled), delay from time of landing to time of arrival at a baggage pick up location and other such statistics can easily be handled. Further, use of RFID tags can note when a passenger left a flight (i.e., at a transfer point) but the passenger's bags stayed on the flight, or vice versa. This will further prevent lost baggage and add to air travel security by noting when passengers and baggage became separated.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A system for centralized security screening comprising:
   means for associating an object under inspection with the identity of an object owner;
   a remote screening facility comprising screening devices, wherein the remote screening facility is adapted for:
      associating the object under inspection with the identity of the object owner using the association means;
      screening the object under inspection using a screening device in accordance with a first screening procedure to obtain screening data; and
      reporting screening data to a centralized screening facility; and
   a centralized screening facility connected to the remote screening facility via a network, wherein the centralized screening facility is adapted for:
      receiving screening data from the remote screening facility;
      reviewing the screening data using a security protocol to determine whether the object under inspection represents a security risk;
      if the object under inspection represents a security risk, then using the identity of the object owner to obtain personal information about the object owner associated with the object under inspection;
      applying the security protocol to the personal information and the screening data to formulate a remedial action plan with respect to the object under inspection; and
      advising the remote screening facility of the remedial action plan.

2. The system for centralized security screening of claim 1, wherein the screening data comprises screening device data, a time stamp reflecting the time the object under inspection was screened, and a location identifier identifying the location of the remote screening facility.

3. The system for centralized security screening of claim 1, wherein the association means comprises an object RFID tag associated with the object under inspection comprising an object RFID identifier, an owner RFID tag associated with the identity of the object owner comprising an object owner RFID identifier that is associated with the object RFID identifier, an RFID identification server, and an RFID poller.

4. The system for centralized security screening of claim 3, wherein:
   the object RFID tag is adapted for:
      receiving a polling signal; and
      transmitting an object RFID tag reflected signal comprising the object RFID identifier;
   the owner RFID tag is adapted for:
      receiving the polling signal; and
      transmitting an owner RFID tag reflected signal comprising the object owner identifier; and
   the RFID poller is adapted for:
      sending a polling signal;
      receiving the object RFID tag reflected signal from the object RFID tag;
      extracting the object RFID identifier from the reflected signal;
      receiving the object owner RFID tag reflected signal from the object owner RFID tag; and
      extracting the object owner RFID identifier from the object owner RFID tag reflected signal; and
   wherein, the RFID identification server is adapted for:
      determining whether the object owner RFID identifier is associated with the object RFID identifier; and
      if the object owner RFID identifier is not associated with the object RFID identifier, then issuing an alert.

5. The system for centralized security screening of claim 4, wherein the remote screening facility is further adapted for sending the object owner RFID identifier, the object RFID identifier, and a measure indicative of whether the owner RFID identifier is associated with the object RFID identifier to the centralized screening facility.

6. The system for centralized security screening of claim 1, wherein the object under inspection comprises baggage.

7. The system for centralized security screening of claim 6, wherein the baggage is selected from the group consisting of checked baggage and carry-on baggage.

8. The system for centralized security screening of claim 1, wherein the remote screening facility further comprises a server adapted for receiving the screening data and for creating data packets from screening data.

9. The system for centralized security screening of claim 1 wherein the centralized screening facility comprises a test image datastore adapted for providing test images to workstations at the centralized screening facility at random intervals.

10. A method for formulating a remedial action plan with respect to an object under inspection comprising:
   associating the object with an object identifier;
   associating an identity of an owner of the object (herein, the "object owner") with an owner identifier;
   associating the object under inspection with the identity of the object owner using the object identifier and owner identifier;
   screening the object under inspection at a remote screening facility using a screening device in accordance with a first screening procedure to obtain screening data and the object identifier;
   reviewing the screening data at a centralized screening facility using a security protocol to determine whether the object under inspection represents a security risk;
   if the object under inspection represents a security risk, then using the identity of the object owner to obtain personal information about the object owner associated with the object under inspection;

applying the securing protocol to the personal information and the screening data to formulate a remedial action plan with respect to the object under inspection; and advising the remote screening facility of the remedial action plan.

11. The method for formulating a remedial action plan with respect to an object under inspection of claim 10, wherein the screening data comprises screening device data, a time stamp reflecting the time the object under inspection was screened, and a location identifier identifying the location of the remote screening facility.

12. The method for formulating a remedial action plan with respect to an object under inspection of claim 10 further comprising:

associating the object under inspection with an object RFID tag, wherein the RFID tag comprises an object RFID identifier; and associating the object owner with an owner RFID tag, wherein the owner RFID tag comprises an object owner RFID identifier; and wherein associating the object under inspection with the identity of the object owner using the object identifier and owner identifier comprises associating the object RFID identifier with the owner RFID identifier.

13. The method for formulating a remedial action plan with respect to an object under inspection of claim 12 further comprising:

receiving at the object RFID tag a polling signal from an RFID poller;

extracting the object RFID identifier from a reflected signal from the object RFID tag;

sending the object RFID identifier to an identification server;

receiving at the owner RFID tag a polling signal from the RFID poller;

extracting the owner RFID identifier from a reflected signal from the owner RFID tag;

sending the owner RFID identifier to the identification server;

determining at the identification server whether the object owner RFID identifier is associated with the object RFID identifier; and if the object owner RFID identifier is not associated with the object RFID identifier, then issuing an alert.

14. The method for formulating a remedial action plan with respect to an object under inspection of claim 10, wherein the object under inspection comprises baggage.

15. The method for formulating a remedial action plan with respect to an object under inspection of claim 14, wherein the baggage is selected from the group consisting of checked baggage and carry-on baggage.

16. The method for formulating a remedial action plan with respect to an object under inspection of claim 10, wherein the remote screening facility further comprises a server adapted for receiving the screening data and for creating data packets from screening data.

17. The method for formulating a remedial action plan with respect to an object under inspection of claim 10, wherein the centralized screening facility comprises a test image datastore adapted for providing test images to workstations at the centralized screening facility at random intervals.

* * * * *